Patented Dec. 3, 1940

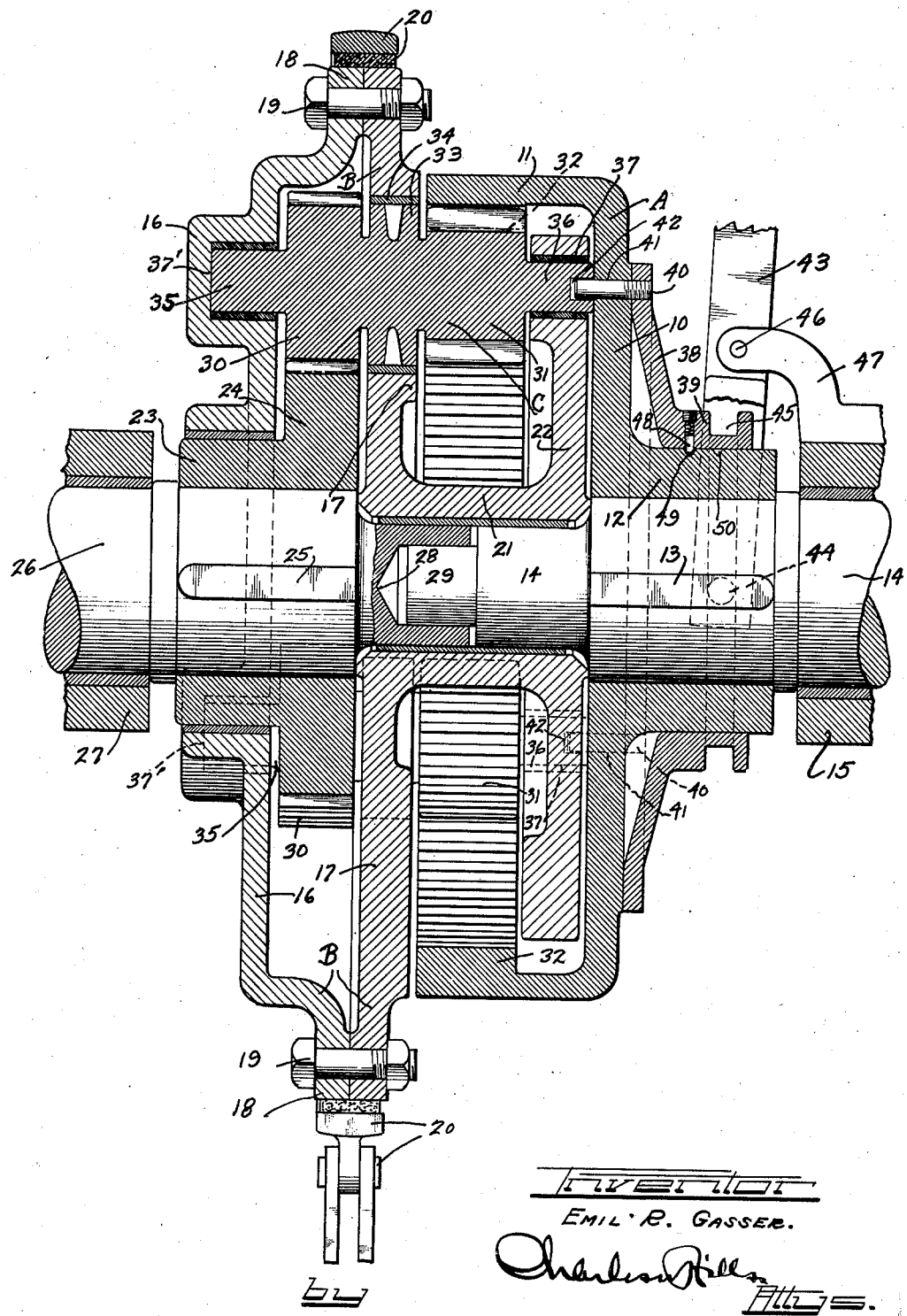

2,223,413

UNITED STATES PATENT OFFICE 2,223,413

GEARED TRANSMISSION COUPLING

Emil R. Gasser, Buffalo, N. Y., assignor to Farrel-Birmingham Company, Incorporated, Ansonia, Conn., a corporation of Connecticut Application September 15, 1939, Serial No. 294,989

2 Claims. (Cl. 74—298)

My invention relates to transmission couplings of the geared type adapted particularly for transmitting driving power from driving sources rotatable only in one direction, such as internal combustion engines. My improved coupling is of particular utility in connection with marine propulsion systems where it would replace the conventional type coupling between the driving source and the reduction gear set driving the propeller so that the rotation of the propeller could be readily reversed, my improved coupling being designed for adjustment for direct mechanical transmission or for reversal of transmission direction.

Among the important features of the invention are simplified means for controlling the operation of the coupling, such as setting for idling or non-transmission, setting for connection of the coupling halves by locked gearing for direct mechanical coupling connection between the driving and driven elements thereof, and setting for relative gear rotation for reversal of driving direction.

The various features of the invention are disclosed on the accompanying drawing, in which the figure is a vertical diametral section of the coupling.

The driving member A of the coupling body comprises a disk 10 having the inwardly directed cylindrical peripheral flange 11, and the outwardly extending hub 12, which hub is secured as by a key 13 to the driving shaft 14 driven by a driving source or assembly capable of rotating the shaft in one direction only. A suitable bearing support 15 is provided for the shaft.

The coupling frame element B comprises the two parts 16 and 17, the part 16 having the radially extending flange 18 abutted by the part 17 and rigidly secured thereto as by bolts 19, the peripheral faces of the flange 18 and the part 17 respectively together forming a cylindrical surface for engagement therewith of brake means 20 which may be in the form of a brake shoe or a brake band.

The part 17 comprises a hub 21 receiving the inner end of the shaft 14, and at the outer end of the hub is the circular flange 22 extending adjacent the inner side of the wall 10 of the coupling body part A. The hub 21 forms a bearing support on the shaft 14 for the inner part 17 of the coupling frame element B. The outer part 16 of the element B receives and is journalled on the hub 23 extending outwardly from a gear 24 disposed between the parts 16 and 17, the hub being secured, as by a key 25, to the driven shaft 26 for which suitable bearing support 27 is provided. The shaft 26 is in axial alignment with the driving shaft 14 and at its inner end may be provided with the bore 28 to receive the reduced inner end 29 of the shaft 14, the shaft ends having thus inter-bearing connection for maintaining their axial alignment. As shown, the bearing hub 21 for the coupling frame element B receives the inner ends of both of the shafts. The shaft 26 is connected with mechanism to be driven. When the coupling is used in a marine propulsion system, the shaft would connect with a driven pinion meshing with a gear for driving the propeller shaft (not shown).

The coupling frame element B carries one or more transmission gear units or assemblies C, three such units spaced 120° apart being shown. Each unit comprises a gear 30 in mesh with the gear 24 on the driven shaft 26, and a gear 31 meshing with the internal gear teeth 32 on the flange 11 of the coupling frame member A. Intermediate the gears 30 and 31, each unit has a supporting part 33 for bearing engagement in the bearing 34 provided in the inner wall of the part 17 of the coupling frame element B. The gears 30 and 31 and the supporting part 33 may be separate elements secured on a common shaft, or, as shown, the gears and the supporting part may be part of an integral structure provided with the supporting shaft ends 35 and 36. The shaft end 35 of each unit is journalled in a recess 37' in the part 16 of the coupling frame element B, while the shaft end 36 of each unit extends through and is journalled in a bearing passageway 37, these bearing passageways being provided in the outer wall 22 of the coupling frame element B.

Mounted on the hub 12 of the coupling frame element A is a clutch plate 38 extending from a sleeve 39 receiving the hub 12, the sleeve being slidable in axial direction on the hub. The clutch plate has clutch pins 40 secured thereto and extending therefrom through the passageways 41 in the wall 10 of the coupling body element A. The purpose of the pins is to clutch or connect the elements A and B directly together for rotation of the element B with the element A. As on the structure shown, there are three transmission gearing units C, I have shown three pins 40 provided and spaced 120° apart, and three passageways 41 likewise spaced, and in the ends of the shafts 36 for the units I have provided recesses or bores 42 for receiving the ends of the clutch pins when the clutch plate 38 is shifted to its inner position on the hub 12.

For shifting the clutch plate, a shift lever 43 is provided which is bifurcated to straddle the clutch plate supporting sleeve 39 and has pins 44 engaging in the circumferential groove 45 in the sleeve 39, the lever 43 above its bifurcated end being fulcrumed on a pin 46 supported by a suitable bracket 47 which may be mounted on the bearing structure 15 for the shaft 14. Upon swing of the lever 43 the sleeve 39 and the clutch plate 38 will be shifted. In the position shown, the clutch plate is in its inner position with the clutch pins engaging in the recesses of the transmission gearing units C, and in this position the clutch structure is yieldably held as by a spring pressed detent pin 48 engaging in a notch 49 in the hub 12. When the clutch plate is shifted outwardly to withdraw the clutch pins from the recesses 42 in the transmission gearing units, the detent pin 48 will engage in the outer detent notch 50 to hold the clutch structure in its unclutching position.

Describing now the operation, when the clutch plate 38 is withdrawn for withdrawal of the clutch pins 40 from the coupling element B, the coupling frame element A will alone rotate with the shaft 14, and the coupling will be running idle.

For forward driving of the driven shaft 26, the clutch mechanism is shifted for clutching together of the clutch frame elements A and B by the clutch pins 40, and the brake 20 is released. Both frame elements A and B will now rotate with the shaft 14 without any relative rotation and therefore the transmission gear units C will be locked against rotation and will travel only bodily with the elements A and B, but as the gears 30 are in mesh with the gear 24 on the driven shaft 26, the gearing units C will act as keys for connecting the rotating coupling frame structure with the gear 24 for rotation thereof and of the shaft 26 in the same direction and at the same speed of the drive shaft 14, the two shafts being directly mechanically coupled together.

For driving the shaft 26 in reverse direction, the clutch mechanism is operated to unclutch the coupling frame elements A and B for relative rotation thereof, and the brake structure 20 is set to hold the frame element B against rotation. The gear units C will then be held against bodily travel, and as the frame element A rotates with the drive shaft 14, the engagement of its internal gear 32 with the gears 31 of the transmission gear units, will cause rotation of the gear units and rotation by the gears 30 of the units of the gear 24 on the driven shaft 26, and this shaft will be driven in reverse direction. By dimensioning of the relative diameters of the various gears, or by providing a different number of teeth on the gears 30 and 31 of the gear units, the speed ratio of the driven shaft relative to that of the driving shaft can be as desired for reverse drive of the driven shaft. In the arrangement shown, the reverse drive speed of the shaft 26 is more than the forward drive thereof.

I thus produce a compact, simple and efficient transmission coupling which may be set for directly mechanically coupling the drive shaft to a driven shaft for forward drive thereof, and which may be set for reverse drive of the driven shaft at a different speed, with the transmission gear units locked against rotation and acting merely as keys during the direct forward driving, but being rotatable for effecting the reverse driving of the driven shaft.

I have shown a practical and efficient embodiment of the features of my invention, but I do not desire to be limited to the exact construction, arrangement and operation shown and described, as changes and modifications may be made without departing from the scope of the invention.

I claim as follows:

1. A transmission coupling comprising a drive shaft and a driven shaft in axial alignment, a driving frame mounted on said driving shaft to rotate therewith and providing an internal gear, a driven gear secured on said driven shaft, transmission gearing elements each comprising a gear meshing with said internal gear and a gear meshing with said driven gear, a coupling frame journalled on said driven gear and on the opposed ends of said shafts and providing bearing supports for said transmission gearing elements, coupling pins on said driving frame, said transmission gearing elements having recesses, means on said driving frame operable to shift said pins into said recesses whereby to lock said frames against relative rotation and to cause said transmission gearing elements to function as keys for rotating said driven gear and shaft in one direction, and means for holding said coupling frame against rotation while said driving frame is rotated whereby the rotation of said driving frame internal gear will cause rotation of said transmission gearing elements for rotation of said driven gear and shaft in reverse direction.

2. A transmission coupling comprising a drive shaft and a driven shaft in axial alignment, a driving frame keyed to the drive shaft for rotation therewith and providing an internal gear, a driven gear keyed to said driven shaft, transmission gearing units each comprising a gear meshing with said internal gear and a gear meshing with said driven gear, a coupling frame having an inner wall, an outer wall and an intermediate wall, bearing supports in said outer wall for journalling said transmission gearing units at their outer ends, bearing passageways in said inner wall for journalling said transmission gearing elements at their inner ends, bearing supports on said intermediate wall for journalling said transmission gearing elements intermediate the gears thereof, a bearing hub joining said inner and intermediate walls for receiving the opposed ends of said shafts, pins on said driving frame, said transmission gearing units having recesses at their inner ends for receiving said pins, means on said driving frame shiftable for projecting said pins into said recesses whereby to interlock said frames for operation of said transmission gearing units as keys to rotate said driven gear and shaft in one direction, and means for holding said coupling frame against rotation while said driving frame is rotated whereby said transmission gearing units will be rotated for rotation of said driven gear and shaft in reverse direction.

EMIL R. GASSER.